US011967267B2

(12) United States Patent
Kim et al.

(10) Patent No.: US 11,967,267 B2
(45) Date of Patent: Apr. 23, 2024

(54) DISPLAY DEVICE

(71) Applicants: Samsung Display Co., Ltd., Yongin-Si (KR); UNIST (ULSAN NATIONAL INSTITUTE OF SCIENCE AND TECHNOLOGY), Ulsan (KR)

(72) Inventors: Hyo Sun Kim, Yongin-si (KR); Oh Sang Kwon, Ulsan (KR); Seong Gyu Choe, Ulsan (KR); Chang Yeong Han, Ulsan (KR); Min Kyung Kim, Yongin-si (KR); You Ra Kim, Yongin-si (KR); Eun Jung Lee, Yongin-si (KR); Hyung Suk Hwang, Yongin-si (KR)

(73) Assignees: Samsung Display Co., Ltd., Yongin-Si (KR); UNIST (Ulsan National Institute Of Science and Technology), Ulju-Gun Ulsan (KR)

( * ) Notice: Subject to any disclaimer, the term of this patent is extended or adjusted under 35 U.S.C. 154(b) by 0 days.

(21) Appl. No.: 18/142,537

(22) Filed: May 2, 2023

(65) Prior Publication Data

US 2024/0038137 A1 Feb. 1, 2024

(30) Foreign Application Priority Data

Jul. 27, 2022 (KR) ........................ 10-2022-0093468

(51) Int. Cl.
*G09G 3/20* (2006.01)

(52) U.S. Cl.
CPC ... *G09G 3/2096* (2013.01); *G09G 2320/0247* (2013.01); *G09G 2360/145* (2013.01); *G09G 2360/16* (2013.01)

(58) Field of Classification Search
CPC ......... G09G 3/2096; G09G 2320/0247; G09G 2360/14–148; G09G 2360/16
See application file for complete search history.

(56) References Cited

U.S. PATENT DOCUMENTS

| | | | | |
|---|---|---|---|---|
| 9,865,231 | B2 * | 1/2018 | Kim | G09G 5/36 |
| 11,756,481 | B2 * | 9/2023 | Kim | G09G 3/3233 345/214 |
| 2023/0162672 | A1 | 5/2023 | Lee et al. | |

FOREIGN PATENT DOCUMENTS

KR 10-20230076912 A 6/2023

OTHER PUBLICATIONS

Seonggyu Choe et al., "Visual Perception beyond the Critical Fusion Frequency", IMID2022, Aug. 24, 2022.

* cited by examiner

*Primary Examiner* — Gene W Lee
(74) *Attorney, Agent, or Firm* — Innovation Counsel LLP

(57) ABSTRACT

Provided is a display device including a display panel, an optical sensor, a timing controller, a scan driver, a data driver, and an image controller. The timing controller controls an image refresh rate of the display panel based on a refresh rate control signal. Thus, the display device provides improved visibility.

16 Claims, 12 Drawing Sheets

DISPLAY DEVICE

CROSS-REFERENCE TO RELATED APPLICATION

This application claims priority to and the benefit of Korean Patent Application No. 10-2022-0093468 filed in the Korean Intellectual Property Office on Jul. 27, 2022, the entire contents of which are incorporated herein by reference.

BACKGROUND

(a) Field of the Disclosure

The present disclosure generally relates to a display device. More particularly, the present disclosure relates to a display device capable of improving visibility.

(b) Description of the Related Art

A display device includes a plurality of pixels. Each of the pixels includes a plurality of transistors, and a light emitting element and a capacitor that are electrically connected to the transistors. The transistors are respectively turned on in response to signals provided through wires, and accordingly, a predetermined driving current is generated. The light emitting element emits light in response to the driving current.

Recently, in order to improve driving efficiency of the display device and minimize power consumption, a method of driving the display device at a low frequency is used.

SUMMARY

The present disclosure has been made in an effort to provide a display device that may improve visibility.

An embodiment of the present disclosure provides a display device including: a display panel including pixels; an optical sensor measuring an optical waveform of the display panel; a timing controller that generates image data based on input image data and generates a first control signal and a second control signal based on a control signal; a scan driver supplying a scan signal to the pixels based on the first control signal; a data driver that generates a data signal corresponding to the image data based on the second control signal and the image data to supply it to the pixels; and an image controller that detects optical characteristic information of the display panel based on the optical waveform, determines a threshold value based on the optical waveform, an image refresh rate of the display panel, and gray scale values corresponding to the input image data, and generates a refresh rate control signal for controlling the image refresh rate based on the optical characteristic information and the threshold value. The timing controller may control the image refresh rate of the display panel based on the refresh rate control signal.

The display panel may be driven at a first refresh rate in a first period, and may be driven at the second refresh rate in a second period after the first period. The first refresh rate may be greater than the second refresh rate.

The optical characteristic information may include a value of flashing luminance. The value of the flashing luminance may correspond to a maximum value of perceived luminance perceived by a user corresponding to a time point at which the image refresh rate is changed from the first period to the second period.

The image controller may compare the value of the flashing luminance with the threshold value, and may generate the refresh rate control signal in response to the compared result.

When the value of the flashing luminance is equal to or greater than the threshold value, the image controller may control the image refresh rate of the display panel to be gradually changed from the first refresh rate in the first period to the second refresh rate in the second period.

The image controller may control the display panel to be driven at a third refresh rate in a third period disposed between the first period and the second period. The third refresh rate may have a value between the first refresh rate and the second refresh rate.

When the value of the flashing luminance is less than the threshold value, the image controller may control the image refresh rate of the display panel to be immediately changed from the first refresh rate in the first period to the second refresh rate in the second period.

The image controller may include: a refresh rate calculator generating refresh rate information corresponding to an image refresh rate of a target image to be displayed in the second period based on the control signal; a grayscale calculator generating grayscale information corresponding to grayscale values for the target image based on the input image data; and a threshold determiner determining the threshold value based on the refresh rate information, the grayscale information, and the optical waveform.

The threshold determiner may determine, as the threshold value, a value obtained by adding a reference value to a value of perceived luminance corresponding to a time point at which the image refresh rate is changed in the first period.

The threshold determiner may determine the threshold value based on a look-up table.

The image controller may further include an optical waveform analyzer generating the optical characteristic information based on the optical waveform.

The optical waveform analyzer may include: a domain converter that detects a frequency characteristic of the optical waveform to generate frequency information; a luminance calculator that detects luminance values of the optical waveform to generate luminance information; and an optical characteristic detector that detects a value of the flashing luminance based on the frequency information and the luminance information of the optical waveform to generate the optical characteristic information.

The domain converter may convert the optical waveform into a frequency domain by using a fast Fourier transform.

The luminance information may include a value of average luminance of the optical waveform.

The image controller may further include: a comparator that compares a value of the flashing luminance included in the optical characteristic information with the threshold value to generate compared result data; and a refresh rate control signal generator that generates the refresh rate control signal based on the compared result data.

The refresh rate control signal generator may apply a weight function to a difference between the value of the flashing luminance and the threshold value to generate the refresh rate control signal.

Another embodiment of the present disclosure provides a display device including: a display panel including pixels; a timing controller that generates image data based on input image data and generates a first control signal and a second control signal based on a control signal; a scan driver supplying a scan signal to the pixels based on the first control signal; a data driver that generates a data signal corresponding to the image data based on the second control signal and the image data to supply it to the pixels; and an image controller that detects a signal waveform of the display panel based on the input image data and the control signal, detects optical characteristic information of the display panel based on the signal waveform, determines a threshold value based on the signal waveform, an image refresh rate of the display panel, and grayscale values corresponding to the input image data, and generates a refresh rate control signal for controlling the image refresh rate based on the optical characteristic information and the threshold value. The timing controller may control the image refresh rate of the display panel based on the refresh rate control signal.

The signal waveform may correspond to an optical waveform of the display panel.

The optical characteristic information may include a value of flashing luminance. The value of the flashing luminance may correspond to a maximum value of perceived luminance perceived by a user corresponding to a time point at which the image refresh rate is changed from a first period in which the display panel is driven at a first refresh rate to a second period in which the display panel is driven at a second refresh rate smaller than the first refresh rate.

The image controller may include an image analyzer that analyzes an image displayed by the display panel based on the input image data and the control signal to detect the signal waveform.

DETAILED DESCRIPTION OF THE EMBODIMENTS

Figure 1:
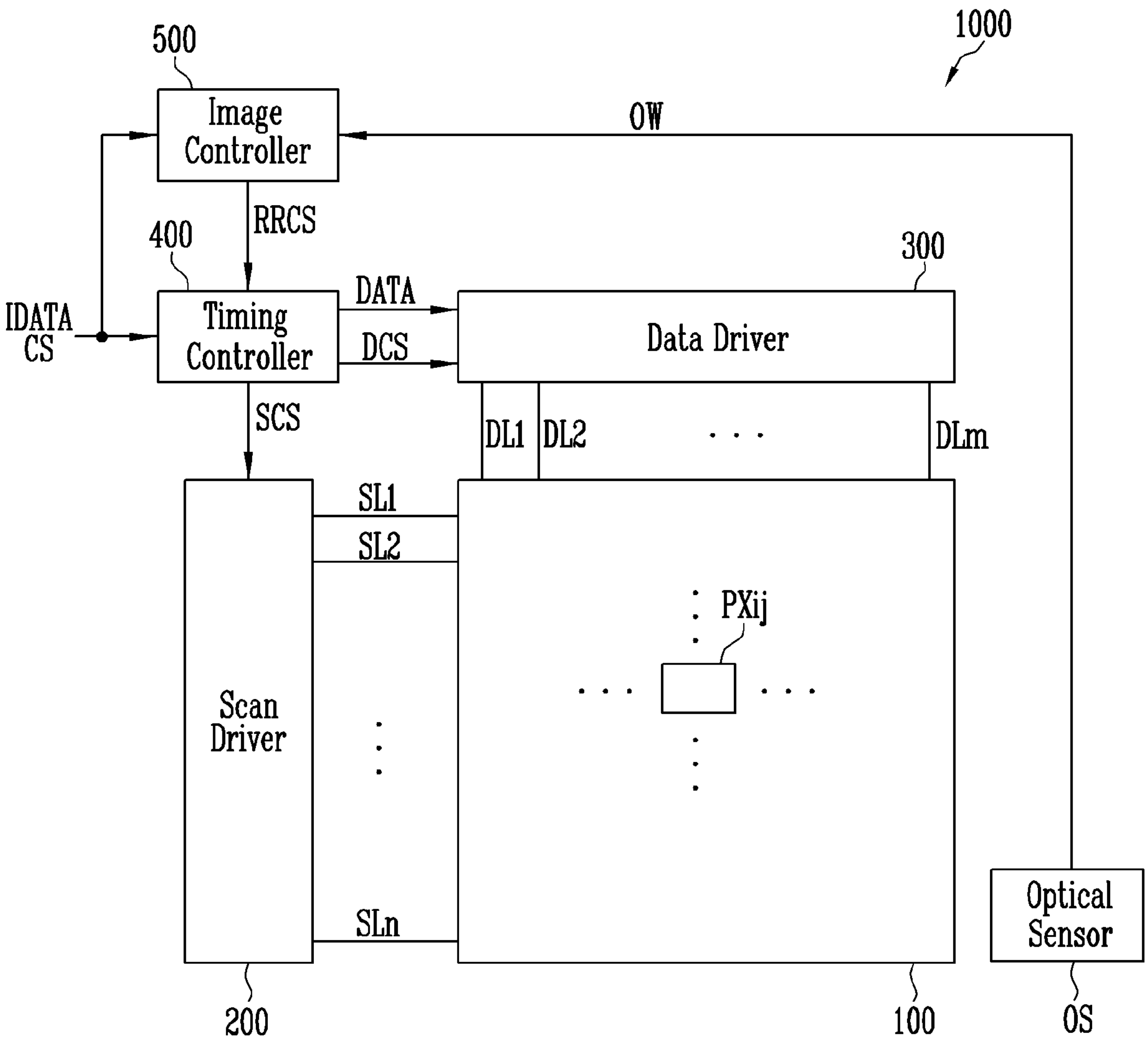
FIG. 1 illustrates a block diagram of a display device according to embodiments of the present disclosure.

Hereinafter, an embodiment of the present disclosure will be described in detail with reference to the accompanying drawings. The same reference numerals are used for the same constituent elements on the drawings, and duplicate descriptions for the same constituent elements are omitted.

Figure 2A:
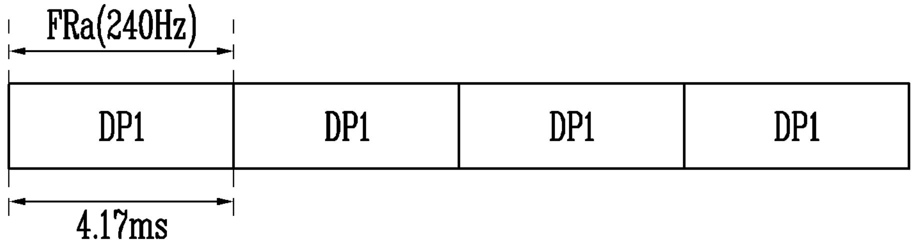
FIGS. 2A, 2B, and 2C illustrate conceptual diagrams for explaining an example of a driving method of a display device according to an image refresh rate.
Figure 2B:
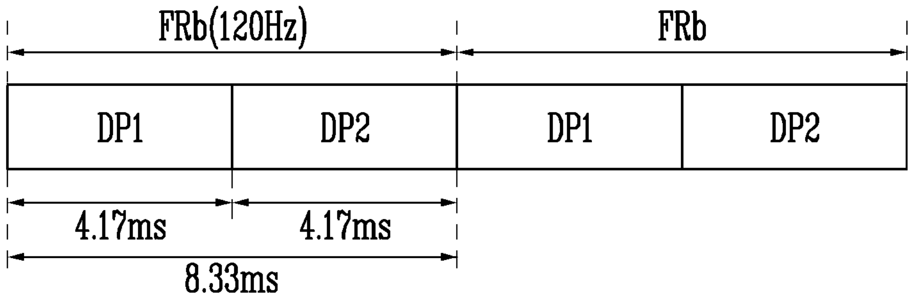
Figure 2C:
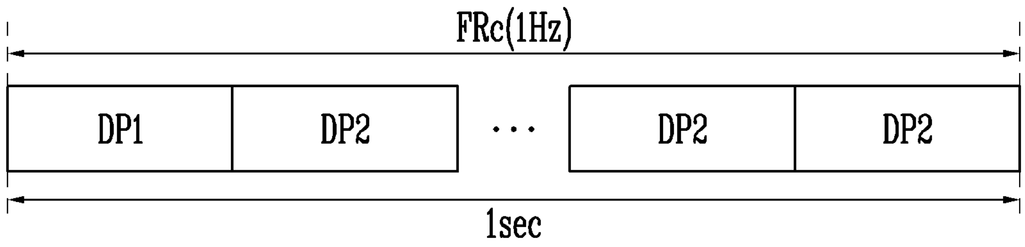
Figure 3A:
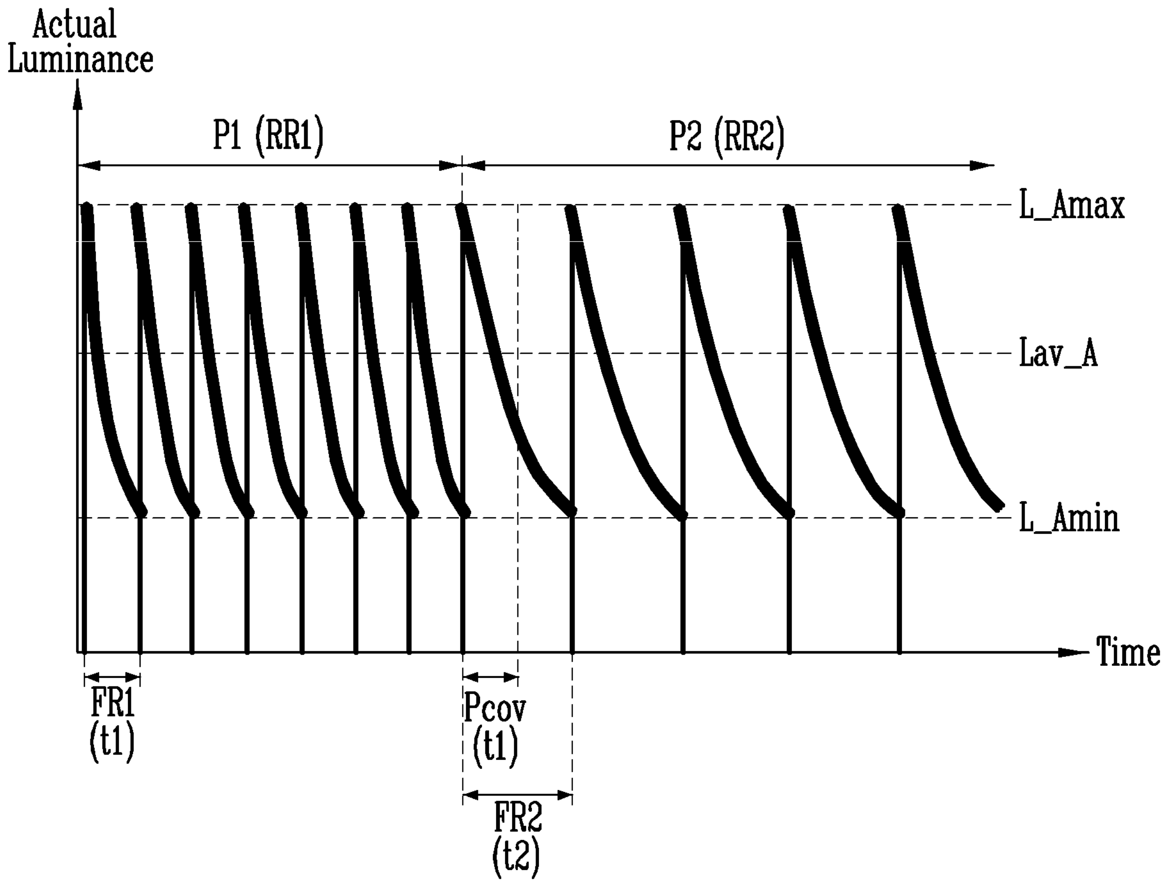
FIG. 3A illustrates a graph for explaining an example of actual luminance according to a change in an image refresh rate.
Figure 3B:
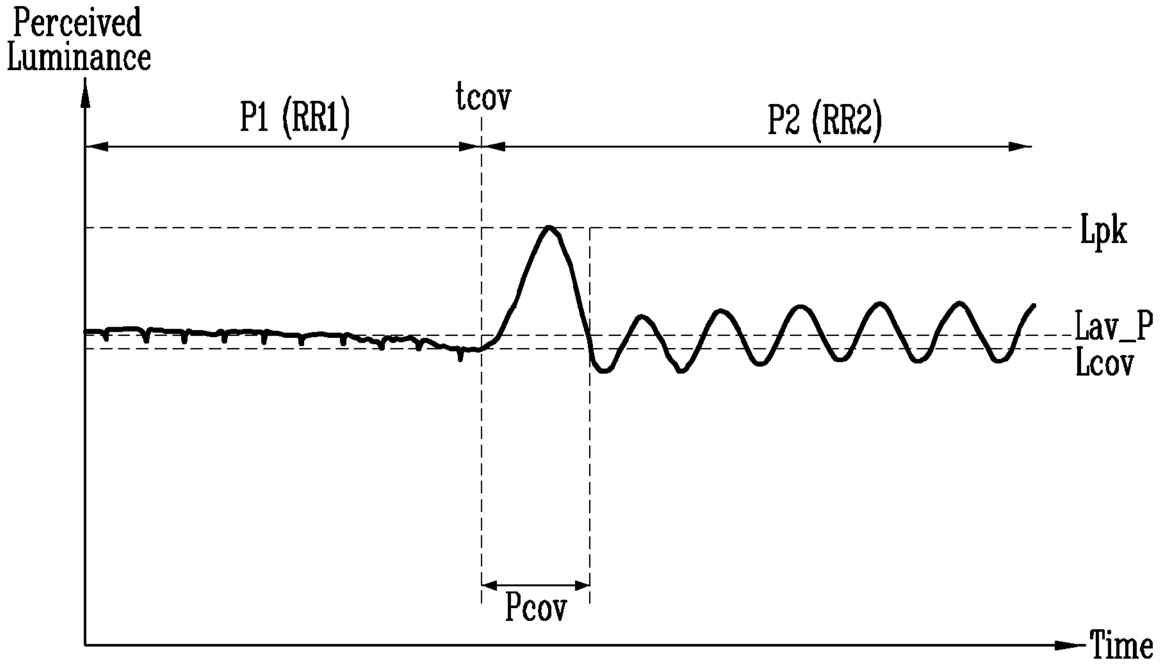
FIG. 3B illustrates a graph for explaining an example of perceived luminance according to a change in an image refresh rate.

FIG. 1 illustrates a block diagram of a display device according to embodiments of the present disclosure. FIGS. 2A, 2B, and 2C illustrate conceptual diagrams for explaining an example of a driving method of a display device according to an image refresh rate. FIG. 3A illustrates a graph for explaining a comparative example of actual luminance according to a change in an image refresh rate. FIG. 3B illustrates a graph for explaining a comparative example of perceived luminance according to a change in an image refresh rate.

Referring to FIG. 1, a display device 1000 may include a display panel 100, a scan driver 200, a data driver 300, a timing controller 400, and an image controller 500. In the embodiment, the display device 1000 may further include an optical sensor OS.

The display panel 100 (or a pixel part) may include pixels PXij. "i" and "j" may be integers larger than zero. Each pixel PXij may be connected to a corresponding data line and scan line. Here, the pixel PXij may mean a pixel in which a scan transistor is connected to an i-th scan line and a j-th data line.

The pixels PXij may be connected to a first power line and a second power line. The pixels PXij may receive a voltage of a first power source through the first power line, and may receive a voltage of a second power source through the second power line. The voltage of the first power source and the voltage of the second power source may be voltages for driving the pixels PXij, and a voltage level of the first power source may be higher than that of the second power source. For example, the voltage of the first power source may be a positive voltage, and the voltage of the second power source may be a negative voltage.

The timing controller 400 may receive input image data IDATA and a control signal CS from the outside (for example, a processor). Here, the control signal CS may include a synchronization signal and a clock signal.

The timing controller 400 may generate a first control signal SCS (or a scan control signal) and a second control signal DCS (or a data control signal) based on the control signal CS. The timing controller 400 may provide the first control signal SCS to the scan driver 200, and may provide the second control signal DCS to the data driver 300.

The first control signal SCS may include a scan start signal, a scan clock signal, and the like. The scan start signal may be a signal for controlling a timing of a scan signal. The scan clock signal may be used to shift the scan start signal.

The second control signal DCS may include a source start signal and a data clock signal. The source start signal may control a sampling starting point of data. The data clock signal may be used to control a sampling operation.

In addition, the input image data IDATA may include grayscale values of an input image corresponding to at least one frame. For example, the input image data IDATA may include grayscale values of each of continuous input images in a frame unit.

The timing controller 400 may generate image data DATA based on the input image data IDATA, and may provide it to the data driver 300.

The scan driver 200 may receive the first control signal SCS from the timing controller 400, and may supply scan signals to scan lines SL1 to SLn based on the first control signal SCS. "n" may be an integer larger than zero. For example, the scan driver 200 may sequentially supply scan signals having a turn-on level pulse to the scan lines SL1 to SLn.

When the scan signals of the turn-on level are sequentially supplied, the pixels PXij may be selected in horizontal line units (or pixel row units), and data signals may be supplied to the selected pixels PXij. For this purpose, the scan signal of the turn-on level may be set to a gate-on voltage (a low voltage or high voltage) so that the transistor included in each of the pixels PXij and receiving the scan signal may be turned on.

The data driver 300 may receive the image data DATA and the second control signal DCS from the timing controller 400, and may responds to the second control signal DCS to supply data signals (or data voltages) corresponding to the image data DATA to data lines DL1 to DLm. "m" may be an integer larger than zero. The data signals supplied to the data lines DL1 to DLm may be supplied to the pixels PXij selected by the scan signals. For this purpose, the data driver 300 may supply the data signals to the data lines DL1 to DLm to be synchronized with the turn-on level scan signal.

The display device 1000 may display an image at various image refresh rates (for example, driving frequencies, or screen refresh rates) according to a driving condition. The image refresh rate may mean a frequency at which the data signal is substantially written to the pixel PXij (for example, a driving transistor included in the pixel PXij). For example, the image refresh rate is also referred to as a screen scan rate or a screen refresh rate, and may indicate a frequency at which a display screen is reproduced for one second.

In the embodiment, corresponding to the image refresh rate, an output frequency of the data driver 300 for one horizontal line (or pixel row) and/or an output frequency of the scan driver 200 that outputs a scan signal (for example, a scan signal provided to a driving transistor included in the pixel PXij) to the pixel PXij may be determined. For example, the refresh rate for driving a moving image may be a frequency of about 120 Hz or higher (for example, 120 Hz, 240 Hz, 360 Hz, 480 Hz, and the like), and the refresh rate for driving a still image may be a frequency of about 60 Hz or less (for example, 30 Hz, 60 Hz, and the like), but these are merely examples, and the present disclosure is not limited thereto.

In this way, the display device 1000 may adjust the output frequency of the scan driver 200 for one horizontal line (or pixel row) and the output frequency of the data driver 300 corresponding thereto according to driving conditions.

Meanwhile, in order to improve image quality, one frame period may include a plurality of non-light emitting periods and a plurality of light emitting periods according to an image refresh rate. For example, a first non-light emitting period and a first light emitting period of one frame may be defined as a first driving period, and subsequent non-light and light emitting periods may be defined as a second driving period.

In order to describe them in relation to the image refresh rate in more detail, referring to FIGS. 2A, 2B, and 2C, the display device 1000 may be driven at various image refresh rates.

A frequency of a first driving period DP1 may correspond to an image refresh rate.

In the embodiment, as shown in FIG. 2A, one frame FRa may include the first driving period DP1. For example, when the frequency of the first driving period DP1 is 240 Hz, the corresponding frame FRa may be driven at 240 Hz. That is, the corresponding frame FRa may be driven at an image refresh rate of 240 Hz. For example, lengths of the first driving period DP1 and the corresponding frame FRa may be about 4.17 ms.

In an embodiment, as shown in FIG. 2B, one frame FRb may include the first driving period DP1 and one second driving period DP2. For example, the first driving period DP1 and the second driving period DP2 may be repeated. For example, the first driving period DP1 and the second driving period DP2 may have the same length. In this case, the corresponding frame FRb may be driven at 120 Hz. That is, the corresponding frame FRb may be driven at an image refresh rate of 120 Hz. For example, the lengths of the first driving period DP1 and one second driving period DP2 may be about 4.17 ms, and the length of the corresponding frame FRb may be about 8.33 ms.

In an embodiment, as shown in FIG. 2C, one frame FRc may include one first driving period DP1 and a plurality of repeated second driving periods DP2. For example, when the corresponding frame FRc is driven at 1 Hz, the corresponding frame FRc has a length of about 1 second (sec.), and the second driving period DP2 within the corresponding frame FRc may be repeated about 239 times. That is, the corresponding frame FRc may be driven at an image refresh rate of 1 Hz.

As described above, by controlling the number of repetitions of the second driving period DP2 within one frame, the display device 1000 may be freely driven at various image refresh rates (for example, 1 Hz to 480 Hz).

More specifically, the lengths of the first driving period DP1 and one second driving period DP2 are fixed at various image refresh rates (for example, the length of the first driving period DP1 and the length of one second driving period DP2 are fixed to 4.17 ms corresponding to 240 Hz, respectively), and by controlling the number of repetitions of the second driving period DP2 within one frame, the display device 1000 may be driven at various image refresh rates. For example, as the number of the second driving periods DP2 increases in one frame, the image refresh rate of the display device 1000 may decrease. For example, when the number of the second driving periods DP2 included in one frame is p, the display device 1000 may be driven at an image refresh rate of 240/(p+1) Hz. "p" may be an integer greater than or equal to 0. That is, the image refresh rate of the display device 1000 may be set as a factor of a frequency (for example, 240 Hz) corresponding to the length of the first driving period DP1 according to the number of the second driving periods DP2 included in one frame.

However, this is merely an example, and the length of the first driving period DP1 and the length of one second driving period DP2 may be fixed to 2.08 ms corresponding to 480 Hz, respectively, and the image refresh rate of the display device 1000 may be set as factors of 480 Hz according to the number of the second driving periods DP2 included in one frame.

Meanwhile, when the image refresh rate of the display device 1000 is changed (or switched) (for example, when the image refresh rate is changed from 120 Hz to 60 Hz or from 240 Hz to 60 Hz, and the like), transient flashing may occur. For example, when the image refresh rate of the display device 1000 is changed, a user may perceive that the luminance of the displayed image is instantaneously increased, and thus the user may perceive the displayed image as flashing (for example, the user perceives a flicker).

For example, referring further to FIG. 3A and FIG. 3B, FIG. 3A illustrates a graph of an example of actual luminance when the display device 1000 is driven at a second refresh rate RR2 in a second period P2 after a first period P1 in which the display device is driven at a first refresh rate RR1, and FIG. 3B illustrates a graph of an example of perceived luminance perceived by a user when the display device 1000 is driven at the second refresh rate RR2 in the second period P2 after the first period P1 in which the display device is driven at the first refresh rate RR1.

Firstly, referring to FIG. 3A, the display device according to the comparative example may be driven at the first refresh rate RR1 in the first period P1, and may be driven at the second refresh rate RR2 in the second period P2 after the first period P1. Here, the first refresh rate RR1 and the second refresh rate RR2 may be different. For example, the first refresh rate RR1 may be greater than the second refresh rate RR2. For example, the first refresh rate RR1 may be 120 Hz, and the second refresh rate RR2 may be 60 Hz, but the present disclosure is not limited thereto, and the second refresh rate RR2 may be greater than the first refresh rate RR1. Hereinafter, for better comprehension and ease of description, the first refresh rate RR1 will be described on the basis that it is greater than the second refresh rate RR2.

On the other hand, since the first refresh rate RR1 is greater than the second refresh rate RR2, a length (shown as 't1') of each first frame FR1 in the first period P1 in which the display device is driven at the first refresh rate RR1 may be shorter than a length (shown as 't2') of each second frame FR2 in the second period P2 in which the display device is driven at the second refresh rate RR2 (for example, a period in which the data signal is written to the display device is short). For example, when the display device is driven at the first refresh rate RR1 (for example, 120 Hz), the data signal may be written with a period of 8.33 ms, and when the display device is driven at the second refresh rate RR2 (for example, 60 Hz), the data signal may be written with a period of 16.67 ms.

As shown in FIG. 3A, the display device according to the example may be driven by changing the image refresh rate from the first refresh rate RR1 to the second refresh rate RR2.

On the other hand, for better comprehension and ease of description, a case in which the luminance of the image displayed by the display device according to the example in the first period P1 is the same as the luminance of the image displayed by the display device according to the example in the second period P2 will be described as a reference. For example, the image displayed by the display device according to the example may have the same first average luminance Lav_A in the first period P1 and the second period P2.

Next, referring further to FIG. 3B, after the display device according to the example is driven at the first refresh rate RR1 in the first period P1, when the image refresh rate is changed and the display device is driven at the second refresh rate RR2 in the second period P2, the average value of the user's perceived luminance may be the same in the first period P1 and the second period P2. For example, as described with reference to FIG. 3A, since the actual luminance of the image displayed by the display device has the same average value (for example, the first average luminance Lav_A) in the first period P1 and the second period P2, the user's perceived luminance may also have the same average value (for example, a second average luminance Lav_P) in the first period P1 and the second period P2.

However, when the image refresh rate of the display device is changed, a transient flashing phenomenon, which is perceived by the user as an instantaneous increase in the luminance of the displayed image, may occur.

For example, as shown in FIG. 3B, even if the average values of the perceived luminance perceived by the user in the first period P1 and the second period P2 are the same as the second average luminance Lav_P, due to the above-described transient flashing phenomenon, at a time point when the refresh rate is changed from the first period P1 to the second period P2 (for example, immediately after the first period P1), the perceived luminance may instantaneously increase. For example, corresponding to the time point at which the refresh rate is changed from the first period P1 to the second period P2 (for example, in a changing period Pcov immediately after the first period P1), the perceived luminance may instantaneously increase up to the peak luminance Lpk (or flashing luminance). In this case, even when the average luminance of the corresponding displayed image is the same when the refresh rate is changed, the transient flashing (or flickering) may be perceived by the user at the moment the refresh rate is changed.

Here, the greater a difference between the value of the peak luminance Lpk (or flashing luminance) and the value of the perceived luminance (shown as 'Lcov' in FIG. 3B) at a changing time point from the first period P1 to the second period P2 (for example, a changing time point tcov), the stronger the above-described transient flashing phenomenon may occur. For example, as the difference between the value of the peak luminance Lpk (or flashing luminance) and the value of the perceived luminance Lcov at the changing time point from the first period P1 to the second period P2 increases, the flashing (or flickering) phenomenon of the displayed image perceived by the user may be more severe.

More specifically, as shown in FIG. 3A, during each first frame FR1 in the first period P1, the actual luminance may decrease from a maximum luminance L_AMax to a minimum luminance L_AMin. That is, in response to the image refresh rate at which the display device is driven in the first period P1, the actual luminance value may be periodically changed between the maximum luminance L_AMax and the minimum luminance L_AMin. Here, since the display device is generally driven at an image refresh rate greater than or equal to a user's critical fusion frequency (CFF), the user does not perceive the luminance as periodically changing as in the actual luminance shown in FIG. 3A, but as illustrated in FIG. 3B, the user may perceive that the luminance of the displayed image is constant in the first period P1. For example, the user may perceive that the luminance of the displayed image in the first period P1 has a constant value as the second average luminance Lav_P, which is an intermediate value between the maximum luminance L_AMax and the minimum luminance L_AMin.

Similarly, as shown in FIG. 3A, during each second frame FR2 in the second period P2, the actual luminance may decrease from the maximum luminance L_AMax to the minimum luminance L_AMin. That is, in response to the image refresh rate at which the display device is driven in the second period P2, the actual luminance value may be periodically changed between the maximum luminance L_AMax and the minimum luminance L_AMin. Here, the user does not perceive that the luminance is periodically changed as in the actual luminance shown in FIG. 3A, but as shown in FIG. 3B, the user may perceive that the luminance of the displayed image is generally constant in the second period P2. For example, as described above, since the second refresh rate RR2 has a smaller value than the first refresh rate RR1, the second refresh rate RR2 may have a value closer to the user's critical fusion frequency. Accordingly, the perceived luminance by the user in the second period P2 may have a form of slightly increasing or slightly decreasing based on the second average luminance Lav_P, but actually, the user may perceive that the luminance of the displayed image in the second period P2 has an overall constant value as the second average luminance Lav_P, which is an intermediate value between the maximum luminance L_AMax and the minimum luminance L_AMin.

Meanwhile, according to the Talbot-Plateau law, the user's perceived luminance of the displayed image may be determined according to the refresh rate of the corresponding image.

Here, when the image refresh rate of the display device is changed from the first refresh rate RR1 to the second refresh rate RR2, due to an instantaneous change in the refresh rate, at a time point at which the first period P1 is changed to the second period P2 according to the above-described Talbot-Plateau law, the average value of the actual luminance for a period corresponding to the first refresh rate RR1 of the first period P1 may be perceived by the user as the luminance of the displayed image.

For example, as shown in FIG. 3A, it may be perceived by the user that the image is displayed as the average value of the actual luminance during the changing period Pcov having the same length t1 as the first frame FR1 immediately after the first period P1. Accordingly, as shown in FIG. 3B, in the changing period Pcov, the user's perceived luminance may instantaneously increase up to the peak luminance Lpk. Accordingly, a transient flashing phenomenon (or flashing phenomenon of the displayed image) may be perceived by the user, and in this case, visibility may be deteriorated.

In order to prevent such a phenomenon, the display device 1000 according to the embodiments of the present disclosure may analyze an optical waveform of the displayed image by the display panel 100 to detect optical characteristic information of the displayed image, and may compare a flashing luminance value predicted according to the optical characteristic information with a threshold value to control a refresh rate of the displayed image.

For example, referring back to FIG. 1, in the embodiment, the display device 1000 according to embodiments of the present disclosure may further include the optical sensor OS.

The optical sensor OS may directly contact the display panel 100 or be spaced apart from the display panel 100 to measure an optical waveform OW of the image displayed by the display panel 100. For example, the optical sensor OS may measure the luminance of light emitted from the display panel 100, and convert the measured luminance into an analog value (for example, a voltage value) to generate the optical waveform OW. For example, the optical sensor OS may include a photo diode. The optical waveform OW may include a frequency characteristic and a luminance characteristic resulting from the display panel 100.

The image controller 500 may receive the optical waveform OW from the optical sensor OS, and may receive the input image data IDATA and the control signal CS from the outside (for example, a processor).

In the embodiment, the image controller 500 may detect the optical characteristic information of the image displayed by the display panel 100 (or the light emitted by the display panel 100) from the optical waveform OW. Here, the optical characteristic information may include a value of the flashing luminance (or the peak luminance (Lpk in FIG. 3*b*)) in the user's perceived luminance described with reference to FIG. 3A and FIG. 3B.

For example, the image controller 500 may detect the optical characteristic information by predicting the value of the flashing luminance that may occur when the image refresh rate is changed from the optical waveform OW of the display panel 100.

In the embodiment, the image controller 500 may compare the flashing luminance value predicted when the image refresh rate is changed according to the optical characteristic information with a threshold value. Here, the threshold value may mean a reference value of the flashing luminance in which a transient flashing phenomenon is perceived by the user (for example, a flicker is perceived by the user) when the image refresh rate is changed. The threshold value may be generated based on the input image data IDATA, the control signal CS, and the optical waveform OW, which will be described in detail with reference to FIG. 5.

In the embodiment, the image controller 500 may compare the optical characteristic information (for example, the value of the flashing luminance) with the threshold value to generate a refresh rate control signal RRCS for controlling the refresh rate of the displayed image in response to the compared result.

For example, the image controller 500 compares the optical characteristic information (for example, the value of the flashing luminance) with the threshold value, and when the value of the flashing luminance is greater than or equal to the threshold value, the image controller 500 may generate the refresh rate control signal RRCS for controlling the image refresh rate to be gradually changed. For example, when the display device 1000 is driven at the first refresh rate in the first period and then is changed to the second refresh rate in the second period, the image controller 500 may generate the refresh rate control signal RRCS for controlling the displayed image to be displayed at a third refresh rate in a third period (or a bridge period) disposed between the first period and the second period. Here, the third refresh rate may have a value between the first refresh rate and the second refresh rate.

In addition, when the value of the flashing luminance is less than the threshold by comparing the optical characteristic information (for example, the value of the flashing luminance) with the threshold, even if the image refresh rate of the display device 1000 is changed, since the user does not perceive the transient flashing phenomenon, the image controller 500 may generate the refresh rate control signal RRCS for controlling the image refresh rate of the display device 1000 to be directly changed from the first refresh rate to the second refresh rate. For example, the display device 1000 may be driven at the first refresh rate in the first period, and then ma by immediately changed to the second refresh rate in the second period immediately after the first period. However, the embodiment of the present disclosure is not limited thereto, and the image controller 500 compares the optical characteristic information (for example, the value of the flashing luminance) with the threshold value, and when the value of the flashing luminance is less than the threshold value, the image controller 500 may not generate a separate control signal (for example, the refresh rate control signal RRCS).

The image controller 500 may provide the refresh rate control signal RRCS to the timing controller 400.

The timing controller 400 may receive the refresh rate control signal RRCS from the image controller 500, and may control the image refresh rate of the displayed image based on the refresh rate control signal RRCS. For example, the timing controller 400 may control, based on the refresh rate control signal RRCS, an output frequency of the data driver 300 for one horizontal line (or pixel row) and/or an output frequency of the scan driver 200 outputting a scan signal to the pixel PXij (for example, a scan signal provided to a driving transistor included in the pixel PXij). As an example, the timing controller 400 may control the output frequency of the scan driver 200 that is outputted by using the first control signal SCS (or the scan control signal) and/or may control the output frequency of the data driver 300 by using the second control signal DCS (or the data control signal).

As described above, the display device 1000 (or the image controller 500) according to the embodiments of the present disclosure may detect the optical characteristic information by analyzing the optical waveform OW of the display panel 100, and may control the image refresh rate by comparing the value of the flashing luminance according to the optical characteristic information and the threshold value determined based on the input image data IDATA and the control signal CS. Accordingly, even if the image refresh rate of the display device 1000 (or the display panel 100) is changed, a phenomenon in which the transient flashing is perceived by the user may be prevented (for example, eliminated), and visibility may be improved.

Meanwhile, the image controller 500 may be configured as an integrated chip (IC) separate from the timing controller 400. However, the present disclosure is not limited thereto. For example, all or a portion of the image controller 500 may be configured as an IC integrated with the timing controller 400. As another example, all or a portion of the image controller 500 may be implemented in software in the timing controller 400.

Figure 4:
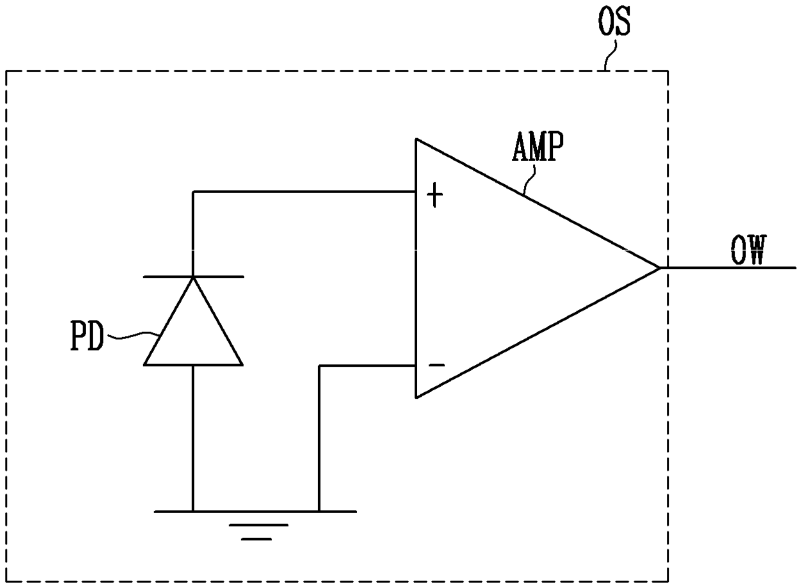
FIG. 4 illustrates an example of an optical sensor included in the display device of FIG. 1.

FIG. 4 illustrates an example of an optical sensor included in the display device of FIG. 1.

Referring to FIG. 1 and FIG. 4, the optical sensor OS may include a photoelectric conversion element PD and an operational amplifier AMP.

The photoelectric conversion element PD may be a photo diode. For example, the photoelectric conversion element PD may be an organic photodiode. One electrode (or a first sensor electrode) of the photoelectric conversion element PD may be connected to a first input terminal (for example, a non-inverting input terminal) of the operational amplifier AMP, and the other electrode (or a second sensor electrode) thereof may be connected to a ground voltage. However, this is merely an example, and one electrode (or the first sensor electrode) of the photoelectric conversion element PD may be connected to a second input terminal (for example, an inverted input terminal) of the operational amplifier AMP.

The photoelectric conversion device PD may generate a carrier including free electrons and holes based on an intensity of incident light, and may generate a current (for example, optical current) by movement of the carrier.

The first input terminal (for example, the non-inverting input terminal) of the operational amplifier AMP may be connected to one electrode (or the first sensor electrode) of the photoelectric conversion element PD, and the second input terminal (for example, the inverting input terminal) thereof may be connected to the ground voltage.

The operational amplifier AMP may output the optical waveform OW to the output terminal based on the optical current generated by the photoelectric conversion element PD. Here, the optical waveform OW may include analog values (for example, voltage values) corresponding to the intensity (for example, luminance) of light incident to the photoelectric conversion element PD.

Accordingly, the optical waveform OW generated (or outputted) by the optical sensor OS may include analog values (for example, voltage values) corresponding to the actual luminance of the image displayed by the display panel 100 (or the luminance of light emitted by the display panel 100). For example, the optical waveform OW may include the values of the actual luminance, as shown in FIG. 3A.

In the embodiment, the optical sensor OS may generate an optical waveform OW corresponding to a plurality of consecutive frames. For example, the optical sensor OS may generate the optical waveform OW corresponding to ten consecutive frames, but the present disclosure is not limited thereto.

Figure 5:
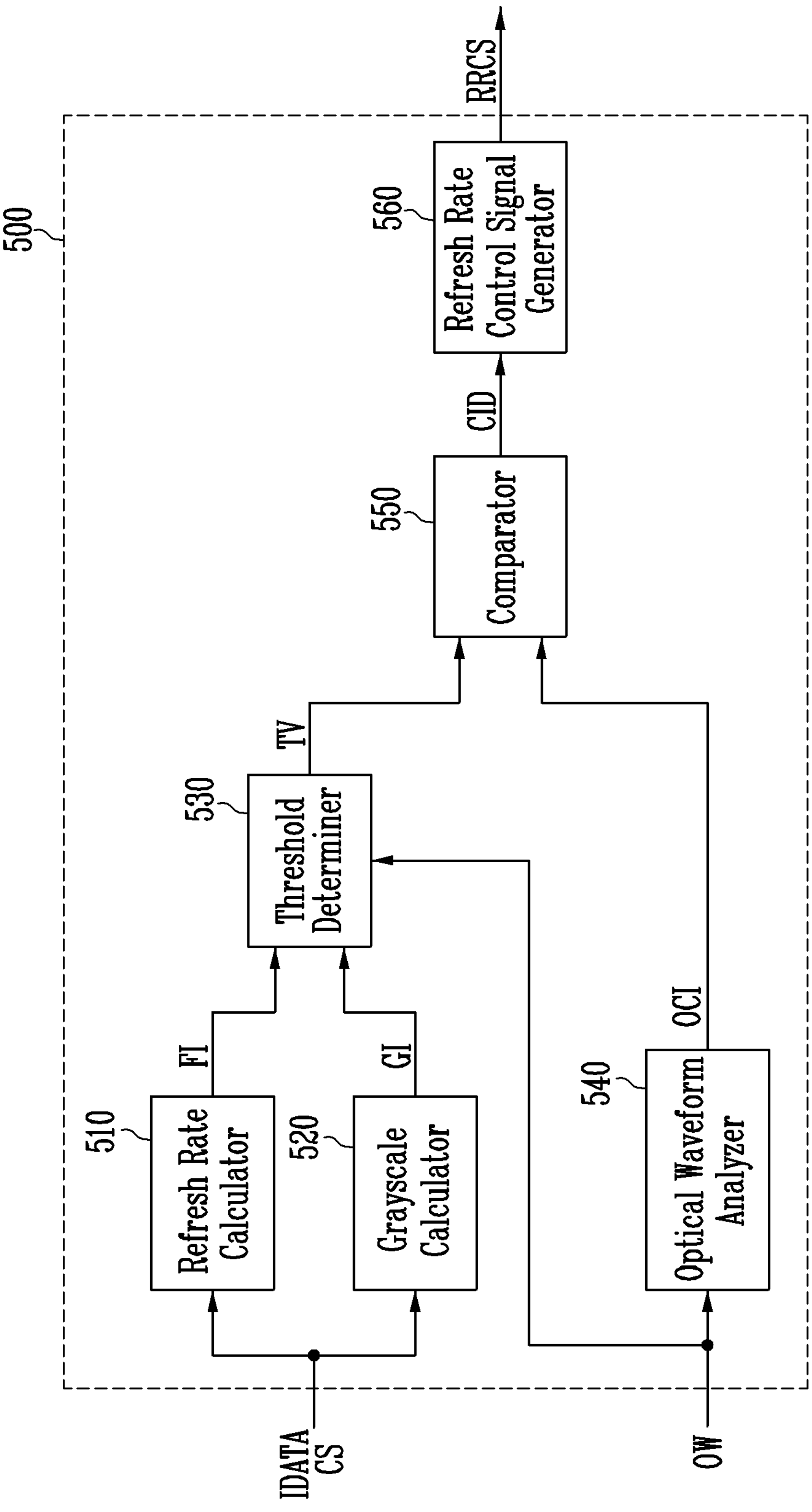
FIG. 5 illustrates a block diagram of an example of an image controller included in the display device of FIG. 1.
Figure 6:
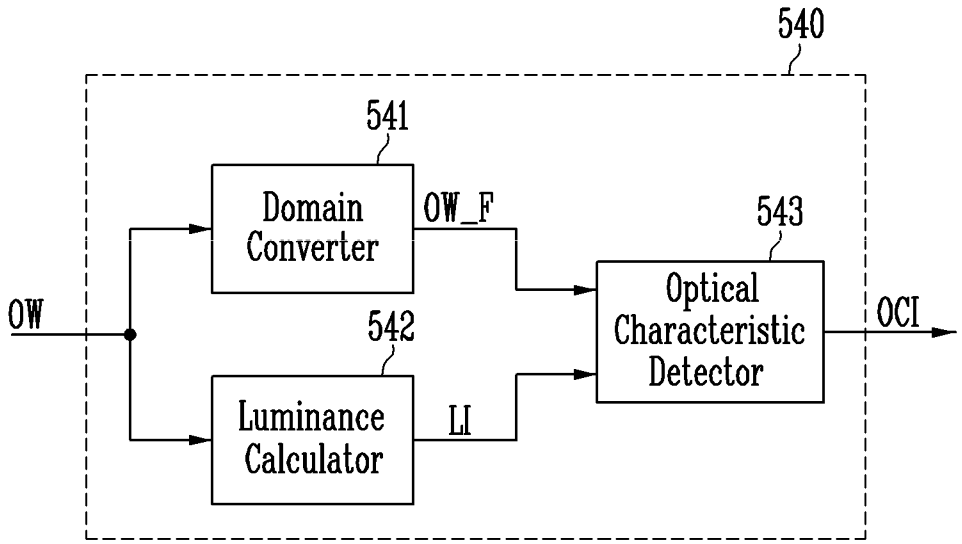
FIG. 6 illustrates a block diagram of an example of an optical waveform analyzer included in the image controller of FIG. 5.

FIG. 5 illustrates a block diagram of an example of an image controller included in the display device of FIG. 1. FIG. 6 illustrates a block diagram of an example of an optical waveform analyzer included in the image controller of FIG. 5.

Referring to FIG. 1 and FIG. 5, the image controller 500 may include a refresh rate calculator 510, a grayscale calculator 520, a threshold determiner 530, an optical waveform analyzer 540, a comparator 550, and a refresh rate control signal generator 560.

In the embodiment, the refresh rate calculator 510 and the grayscale calculator 520 may generate (or detect) refresh rate information FI (or frequency information) and grayscale information GI based on the input image data IDATA and the control signal CS.

The refresh rate calculator 510 may generate (or detect) the refresh rate information FI corresponding to the image refresh rate of a target image based on the control signal CS (or the control signal CS and the input image data IDATA). For example, the refresh rate calculator 510 may generate the refresh rate information FI for the target image based on a clock signal included in the control signal CS. However, this is merely an example, and the embodiment of the present disclosure is not limited thereto, and the refresh rate calculator 510 may generate the refresh rate information FI by using various methods.

Here, the target image may mean a displayed image to be driven by changing the image refresh rate of the display device 1000. For example, the display device 1000 is currently driven at the first refresh rate in the first period, and the image refresh rate is changed in the second period after the first period, it may be driven at the second refresh rate. Here, the second period may mean a period in which the refresh rate is changed and driven after the first period in which the display device 1000 is currently driven. In other words, the target image may mean an image to be displayed by the display device 1000 in the second period.

That is, the refresh rate calculator 510 may generate the refresh rate information FI by calculating a refresh rate (for example, the second refresh rate) for the target image to be displayed in the second period based on the control signal CS (or the control signal CS and the input image data IDATA).

The grayscale calculator 520 may generate (or detect) the grayscale information GI for the target image based on the input image data (IDATA). For example, the grayscale calculator 520 may generate the grayscale information GI by extracting grayscale values for the input image of the target image based on the input image data IDATA. However, this is merely an example, and the embodiment of the present disclosure is not limited thereto, and the grayscale calculator 520 may generate the grayscale information GI by using various methods.

In the embodiment, the grayscale calculator 520 may generate the grayscale information GI by calculating grayscale values of at least one frame (for example, the second frame) included in the second period. That is, the grayscale calculator 520 may calculate grayscale values of the input image for the target image to be driven by changing the refresh rate.

The threshold determiner 530 may receive the refresh rate information FI and the grayscale information GI from the refresh rate calculator 510 and the grayscale calculator 520, and may receive the optical waveform OW from the optical sensor OS.

The threshold determiner 530 may determine a threshold value TV based on the refresh rate information FI, the grayscale information GI, and the optical waveform OW.

In the embodiment, when the image currently displayed by the display device 1000 (or the display panel 100) is displayed as the target image after the refresh rate is changed based on the optical waveform OW, the threshold determiner 530 may determine the threshold value TV at which a transient flashing phenomenon is perceived by the user (for example, a flicker is perceived by the user).

For example, based on the optical waveform OW of the image currently displayed by the display device 1000 (or the display panel 100), and based on the refresh rate information FI and the grayscale information GI for the target image to be displayed after the refresh rate is changed, the threshold determiner 530 may determine the threshold value TV at which a transient flashing phenomenon is perceived by the user (for example, a flicker is perceived by the user) at a time point when the image refresh rate is changed. Here, as described with reference to FIG. 1, the threshold value TV may mean a reference value of flashing luminance in which a transient flashing phenomenon is perceived by a user (for example, a flicker is perceived by a user) when an image refresh rate is changed.

In the embodiment, the threshold determiner 530 may determine the threshold values TV by using a look-up table (LUT) in which the threshold values TV according to the information on the optical waveform OW of the displayed image, and the refresh rate information FI and the grayscale information GI of the target image are previously stored.

According to the embodiments, the threshold values TV previously stored in the look-up table may be experimentally determined based on the optical waveform, and the refresh rate and the grayscale value of the target image, but these are merely examples, and the embodiment of the present disclosure is not limited thereto. For example, the threshold determiner 530 may determine the threshold values TV by using a separate algorithm based on the information on the optical waveform OW of the displayed image, and the refresh rate information FI and the grayscale information GI of the target image.

The optical waveform analyzer 540 may receive the optical waveform OW to generate (or detect) optical characteristic information OCI of the optical waveform OW.

In the embodiment, the optical waveform analyzer 540 may analyze the optical waveform OW, and may generate the optical characteristic information OCI including the value of the flashing luminance (for example, the maximum value of the flashing luminance) predicted according to the analyzed result.

For a more detailed description, referring further to FIG. 6, the optical waveform analyzer 540 may include a domain converter 541, a luminance calculator 542, and an optical characteristic detector 543.

The domain converter 541 may generate frequency information OW_F by detecting a frequency characteristic of the optical waveform OW based on the optical waveform OW.

In the embodiment, the domain converter 541 may receive the optical waveform OS from the optical sensor OS to convert it into a frequency domain. The optical waveform OW may be expressed in a time domain, and the domain converter 541 may convert the optical waveform OW in the time domain into the frequency domain. Accordingly, the domain converter 541 may express the optical waveform OW as a size value for each frequency. For example, the domain converter 541 may convert the domain of the optical waveform OW by using a Fast Fourier transform (FFT), but is not limited thereto.

The luminance calculator 542 may generate luminance information LI on luminance values of the optical waveform OW based on the optical waveform OW.

In the embodiment, the luminance calculator 542 may receive the optical waveform OW from the optical sensor OS, and may calculate the luminance values of the displayed image according to the optical waveform OW. For example, the luminance calculator 542 may generate the luminance information LI by calculating values of maximum luminance, minimum luminance, and average luminance among the luminance values of the optical waveform OW.

The optical characteristic detector 543 may receive frequency information OW_F from the domain converter 541, and may receive the luminance information LI from the luminance calculator 542.

In the embodiment, the optical characteristic detector 543 may detect the values of the flashing luminance predicted based on the frequency information OW_F and the luminance information LI on the optical waveform OW, and may generate the optical characteristic information OCI including the values of the flashing luminance. For example, the optical characteristic detector 543 may generate the optical characteristic information OCI by using an activation function (or an algorithm) that outputs the values of the predicted flashing luminance for the frequency and luminance of the optical waveform OW, but is not limited thereto.

Referring back to FIG. 5, the comparator 550 may receive the threshold value TV and the optical characteristic information OCI, and may generate comparison result data CID by comparing the flashing luminance value (for example, the maximum value) and the threshold value TV corresponding to the refresh rate (for example, the second refresh rate corresponding to the second period) and the grayscale values of the target image, among the flashing luminance values predicted according to the optical characteristic information OCI.

The refresh rate control signal generator 560 may receive the comparison result data CID, and may generate the refresh rate control signal RRCS based on the comparison result data CID.

In the embodiment, the refresh rate control signal generator 560 may generate the refresh rate control signal RRCS for controlling the image refresh rate of the display device 1000 to be gradually changed when the maximum value of the flashing luminance of the target image predicted according to the optical characteristic information OCI is equal to or greater than the threshold value TV. For example, the refresh rate control signal generator 560 may generate the refresh rate control signal RRCS for controlling an image (for example, a target image) to be displayed at the third refresh rate in the third period (or the bridge period) disposed between the first period driven at the first refresh rate and the second period in which the image refresh rate is changed and driven at the second refresh rate. Here, the third refresh rate may have a value between the first refresh rate and the second refresh rate. For example, when the first refresh rate is 120 Hz and the second refresh rate is 60 Hz, the third refresh rate may have a value of 61 Hz to 65 Hz. However, this is merely an example, and the value of the third refresh rate is not limited thereto. For example, the third refresh rate may have a value of 66 Hz or more and less than 120 Hz.

In some embodiments, the refresh rate control signal generator 560 may control the value of the third refresh rate based on a difference between the threshold value TV and the maximum value of the flashing luminance according to the optical characteristic information OCI. For example, the refresh rate control signal generator 560 may control the third refresh rate to have a larger value as the difference between the threshold value TV and the maximum value of the flashing luminance according to the optical characteristic information OCI increases. For example, the refresh rate control signal generator 560 may determine the value of the third refresh rate by applying a weight function to the difference between the threshold value TV and the maximum value of the flashing luminance according to the optical characteristic information OCI.

In the embodiment, the refresh rate control signal generator 560 the refresh rate control signal RRCS for controlling the image refresh rate of the display device 1000 to be directly changed from the first refresh rate to the second refresh rate when the value of the flashing luminance of the target image predicted according to the optical characteristic information OCI is less than the threshold value TV. For example, based on the refresh rate control signal RRCS, the display device 1000 is driven at the first refresh rate in the first period, and then is driven at the second refresh rate in the second period changed immediately after the first period to display the target image. However, the embodiment of the present disclosure is not limited thereto. For example, when the value of the flashing luminance of the target image predicted according to the optical characteristic information OCI is less than the threshold value TV, the refresh rate control signal generator 560 may not generate a separate control signal (for example, the refresh rate control signal RRCS).

Figure 7A:
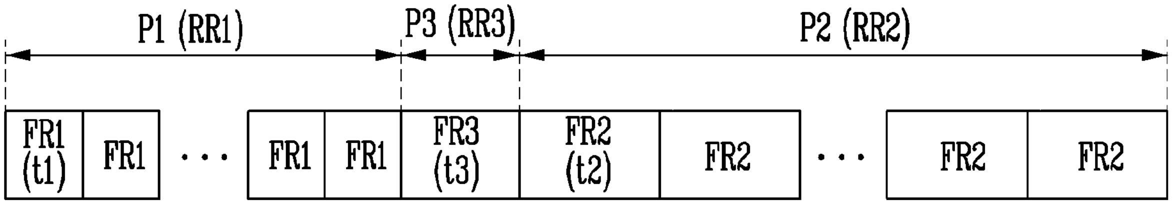
FIG. 7A and FIG. 7B illustrate drawings for explaining an example of an operation of the image controller of FIG. 5.
Figure 7B:
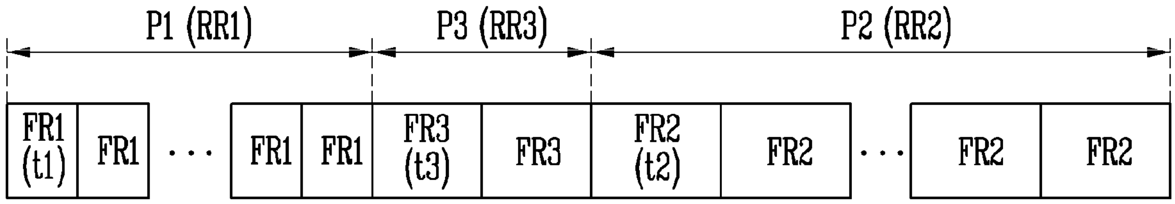

FIG. 7A and FIG. 7B illustrate drawings for explaining an example of an operation of the image controller of FIG. 5.

Referring to FIG. 1, FIG. 5, and FIG. 7A, the display device 1000 may be driven at the first refresh rate RR1 in the first period P1. For example, the display device 1000 may drive each first frame FR1 included in the first period P1 at the first refresh rate RR1. In addition, the display device 1000 may drive each second frame FR2 included in the second period P2 in which the target image is displayed at the second refresh rate RR2. Here, for better comprehension and ease of description, the first refresh rate RR1 will be described on the basis that it is greater than the second refresh rate RR2. That is, the length t1 of the first frame FR1 driven at the first refresh rate RR1 may be shorter than the length t2 of the second frame FR2 driven at the second refresh rate RR2.

The image controller 500 may analyzes the optical waveform OW for the image displayed on the display panel 100 (or the light emitted from the display panel 100) in response to the first period P1, and may detect the flashing luminance value of the target image to be displayed in the second period P2. In addition, based on the input image data IDATA and the control signal CS corresponding to the target image, the image control unit 500 calculates the threshold value TV, and compares the threshold value TV with the flashing luminance value of the target image, so that when the flashing luminance value is greater than or equal to the threshold value TV, it may control the display device 1000 to drive by inserting the third period P3 (for example, the bridge period) disposed between the first period P1 and the second period P2. For example, the third period P3 is a period which is disposed between the first period P1 and the second period P2, and may correspond to a period in which the display device 1000 is driven at the third refresh rate RR3. That is, the display device 1000 may be driven at the first refresh rate RR1 in the first period P1, driven at the third refresh rate RR3 in the third period P3, and then driven at the second refresh rate RR2 in the second period P2.

Here, as described above, the third refresh rate RR3 may have a value between the first refresh rate RR1 and the second refresh rate RR2. Accordingly, a length t3 of the third frame FR3 driven at the third refresh rate RR3 may be longer than the length t1 of the first frame FR1 driven at the first refresh rate RR1, and may be shorter than the length t2 of the second frame FR2 driven at the second refresh rate RR2.

As such, the display device 1000 (or the image controller 500) according to the embodiments of the present disclosure may insert the third period P3 disposed between the first period P1 and the second period P2, when the display device 1000 is driven at the first refresh rate RR1 and then at the second refresh rate RR2, and when it is determined that a transient flashing phenomenon (or flickering phenomenon) in which the flashing luminance is perceived by the user is perceived according to the flashing luminance value according to the change of the image refresh rate. Accordingly, the image refresh rate may be controlled to be gradually (or stepwise), and in this case, a phenomenon in which transient flashing is perceived by the user may be prevented (for example, eliminated), and visibility may be improved.

Meanwhile, FIG. 7A illustrates that the display device 1000 is driven at the third refresh rate RR3 during one third frame FR3 in the third period P3 and then driven at the second refresh rate RR2 in the second period P2, but this is only an example, and the embodiment of the present disclosure is not limited thereto, and the display device 1000 may be driven at the third refresh rate RR3 during a plurality of the third frames FR3 in the third period P3.

For example, referring further to FIG. 7B, the display device 1000 may be driven at the third refresh rate RR3 during two third frames FR3 in the third period P3 and then may be driven at the second refresh rate RR2 in the second period P2.

Figure 8A:
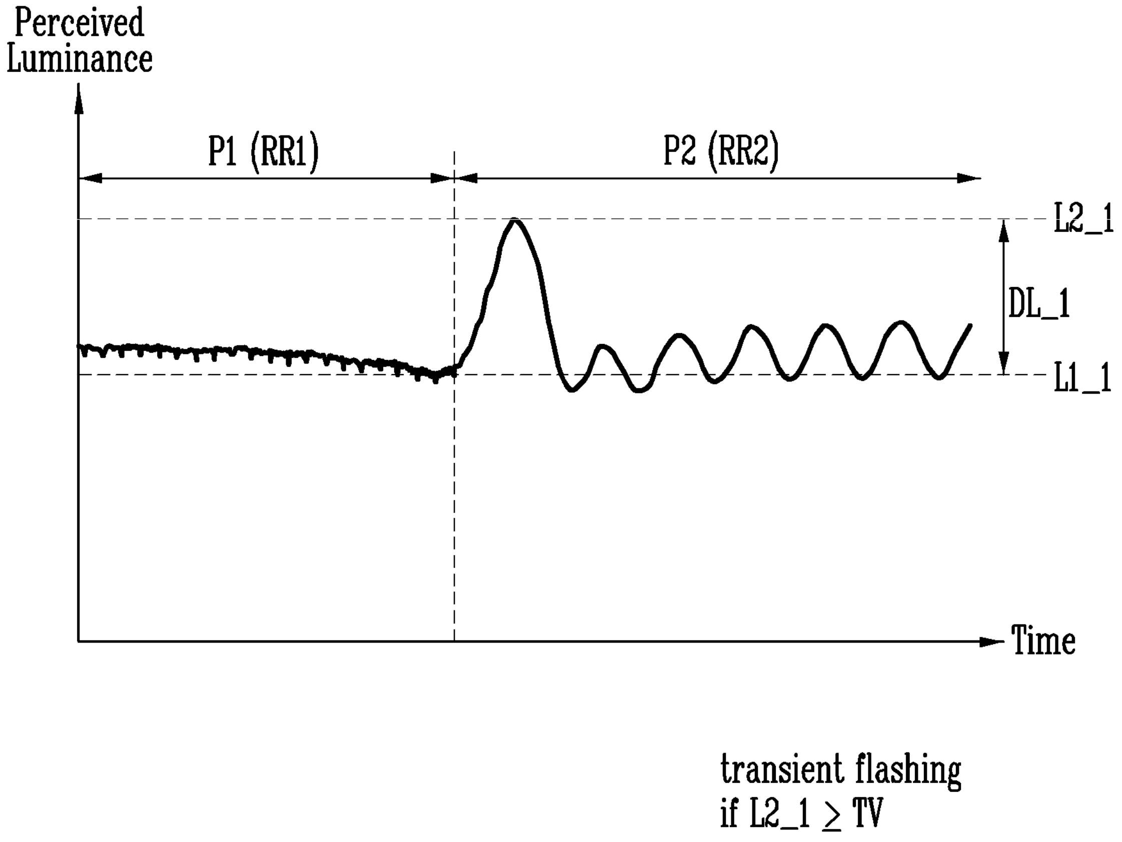
FIG. 8A illustrates a graph for explaining an example of perceived luminance without insertion of a bridge period (a bridge period).
Figure 8B:
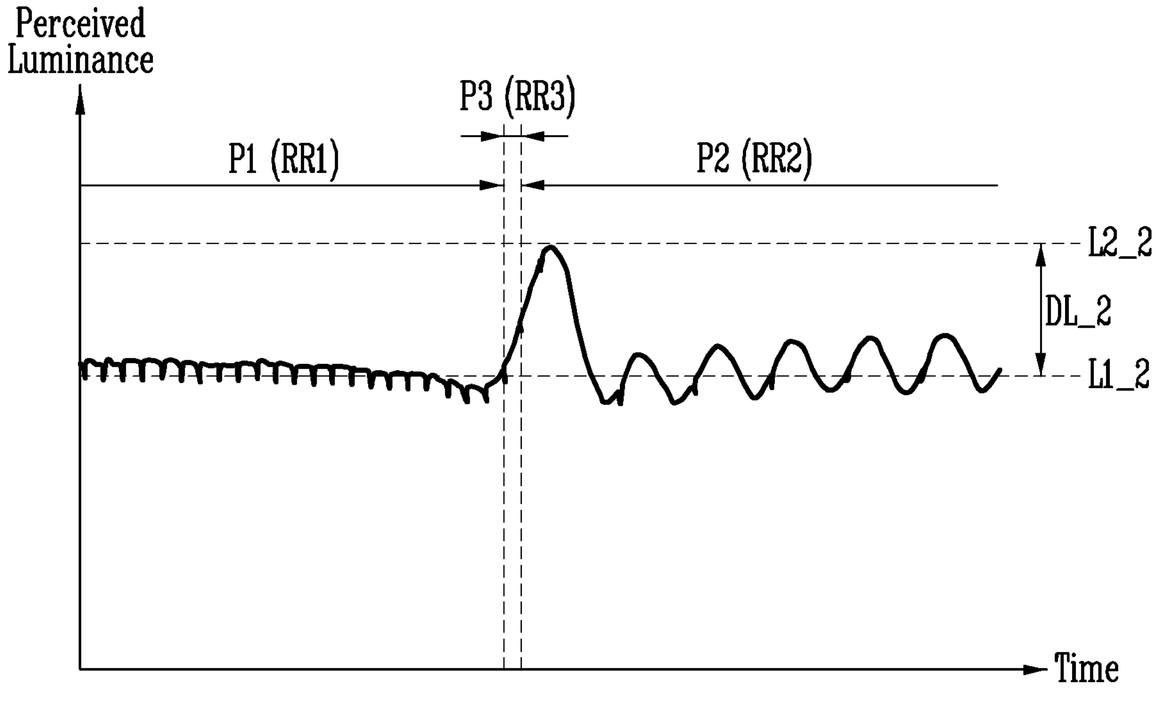
FIG. 8B illustrates a graph for explaining an example according to a third period (a bridge period) inserted between a first period and a second period.

FIG. 8B illustrates a graph for explaining an example of perceived luminance according to the third period (the bridge period) which is inserted between the first period and the second period.

Meanwhile, FIG. 8A illustrates an example of the perceived luminance perceived by the user when the display device 1000 (see FIG. 1) is driven in the second period P2 at the second refresh rate RR2 without insertion of the bridge period after the first period P1 in which the display device 1000 (see FIG. 1) is driven at the first refresh rate RR1. In addition, FIG. 8B illustrates an example of the perceived luminance perceived by the user when the display device 1000 (see FIG. 1) is driven by inserting the third period P3 in which the display device 1000 is driven at the third refresh rate RR2 between the first period P1 in which the display device 1000 (see FIG. 1) is driven at the first refresh rate RR1 and the second period P2 in which the display device 1000 is driven at the second refresh rate RR2.

Firstly, referring to FIG. 1, FIG. 5, FIG. 6, FIG. 7A, and FIG. 8A, the display device 1000 may be driven in the first period P1 and the second period P2. In this case, the above-described transient flashing phenomenon may or may not be perceived by the user according to a first difference value DL_1 between a first luminance L1_1 and a second luminance L2_1.

Here, the value of the first luminance L1_1 may mean a perceived luminance corresponding to a time point at which the refresh rate is changed in the first period P1 (for example, a time point at which the first period P1 is changed to the second period P2 in FIG. 8A). In addition, the value of the second luminance L2_1 may mean the maximum value of the above-described flashing luminance.

Here, as the first difference value DL_1 increases, the degree to which the user perceives the flashing luminance may increase, and when the first difference value DL_1 exceeds a predetermined value, a flicker may be perceived by the user.

Here, when the second luminance L2_1, which is the maximum value of the flashing luminance, is less than the threshold value TV described with reference to FIG. 5, a transient flashing phenomenon (or flickering phenomenon) may not be perceived by the user. For example, when the first difference value DL_1 corresponding to the difference between the second luminance L2_1 and the first luminance L1_1 is less than the reference value, a transient flashing phenomenon (or a flickering phenomenon) may not be perceived by the user. That is, the threshold value TV may correspond to a value obtained by adding the reference value to the first luminance L1_1.

In this case, the image controller 500 (or the display device 1000) may generate the refresh rate control signal RRCS for controlling the image refresh rate of the display device 1000 to be changed immediately from the first refresh rate RR1 to the second refresh rate RR2. In other words, the display device 1000 may be driven in the second period P2 immediately after the first period P1 without a separate bridging period.

Alternatively, when the second luminance L2_1, which is the maximum value of the flashing luminance, is equal to or greater than the threshold value TV, a transient flashing phenomenon (or flickering phenomenon) may be perceived by the user. For example, when the first difference value DL_1 corresponding to the difference between the second luminance L2_1 and the first luminance L1_1 is equal to or greater than the reference value, a transient flashing phenomenon (or flickering phenomenon) may not be perceived by the user.

In this case, the image controller 500 (or the display device 1000) may generate the refresh rate control signal RRCS for controlling the image refresh rate of the display device 1000 to be gradually changed from the first refresh rate RR1 to the second refresh rate RR2.

For example, referring further to FIG. 8B, the image controller 500 may control the display device 1000 to be driven by inserting the third period P3 (or bridge period) in which the display device 1000 is driven at the third refresh rate RR3 between the first period P1 and the second period P2.

For example, as described with reference to FIG. 5, the third period P3 corresponds to the period disposed between the first period P1 and the second period P2, and the third refresh rate RR3 may have a value between the first refresh rate RR1 and the second refresh rate RR2.

Here, according to the insertion driving of the third period P3, the second difference value DL_2 between the first luminance L1_2 corresponding to the time point when the refresh rate is changed in the first period P1 (for example, the time point of being changed from the first period P1 to the third period P3 in FIG. 8B) and the second luminance L2_2 that is the maximum value of the flashing luminance may be smaller than the first difference value DL_1 of FIG. 8A. That is, according to the insertion driving of the third period P3, the degree to which the user perceives the flashing luminance may be reduced, and accordingly, the transient flashing phenomenon (or flickering phenomenon) is not perceived by the user, so the visibility may be improved.

On the other hand, as described above, the maximum value of the flashing luminance (that is, the second luminance L2_2) according to the insertion driving of the third period P3 may be less than the threshold value TV described above with reference to FIG. 5.

Figure 9:
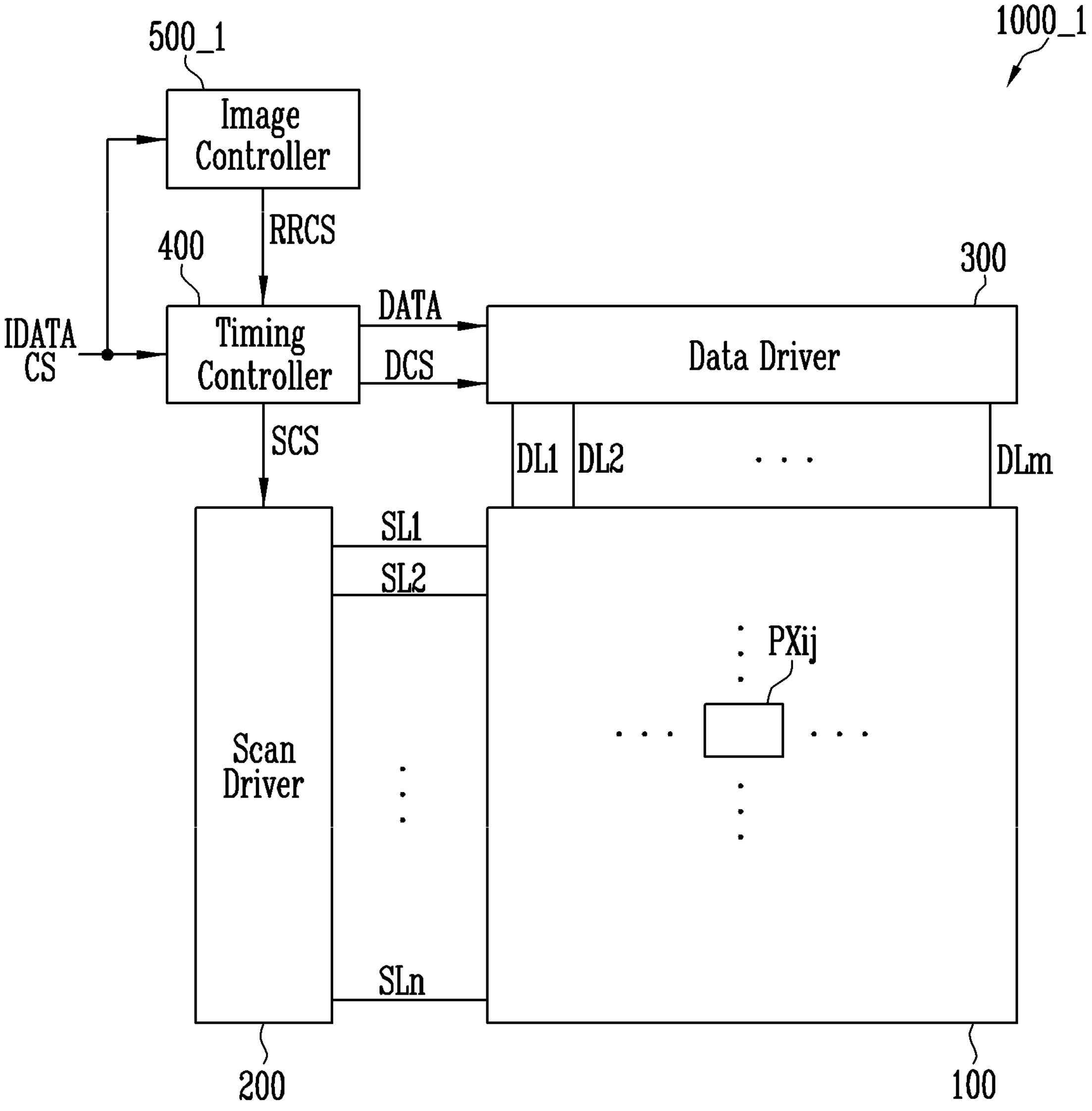
FIG. 9 illustrates a block diagram of a display device according to embodiments of the present disclosure.
Figure 10:
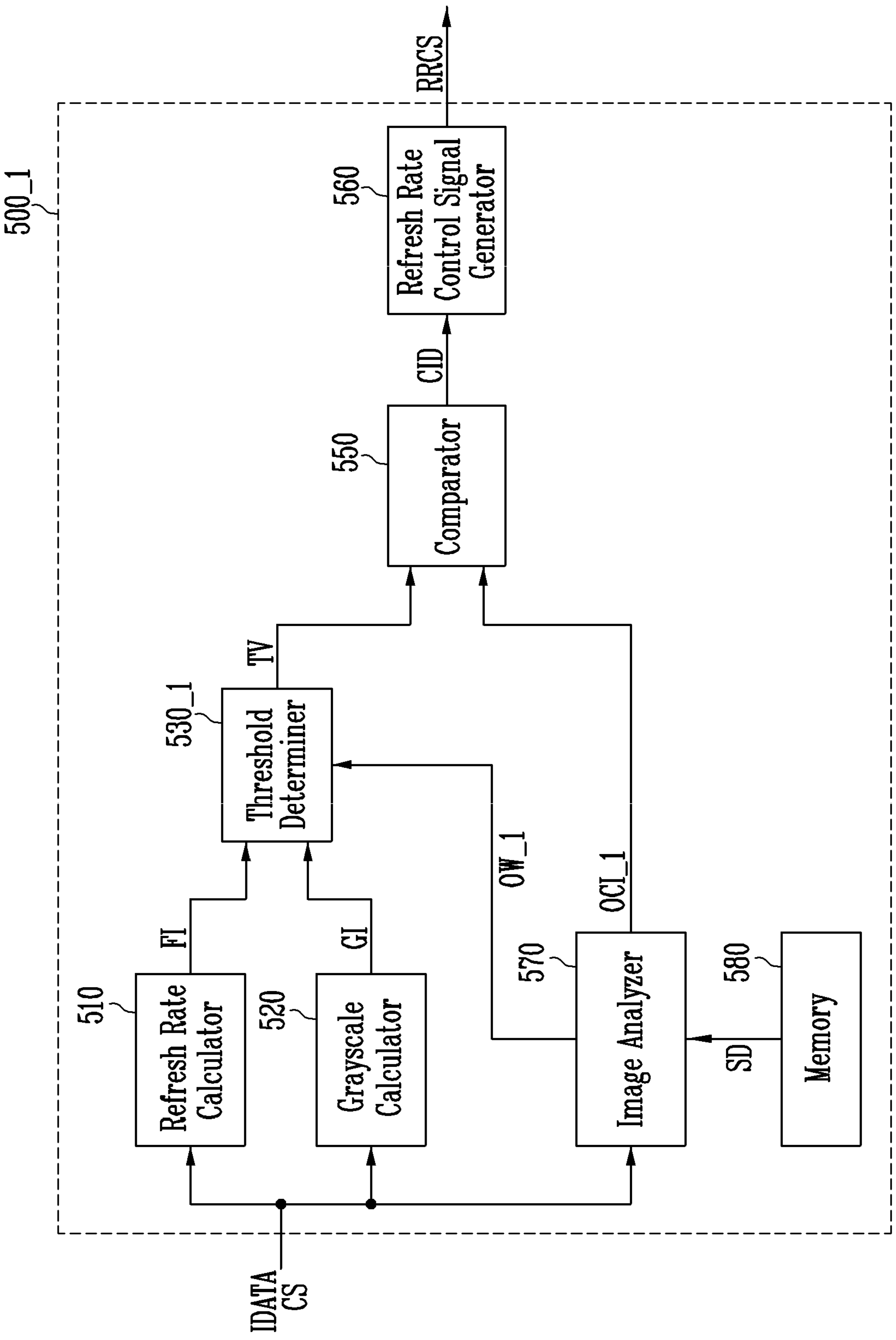
FIG. 10 illustrates a block diagram of an example of an image controller included in the display device of FIG. 9.

FIG. 9 illustrates a block diagram of a display device according to embodiments of the present disclosure. FIG. 10 illustrates a block diagram of an example of the image controller included in the display device of FIG. 9.

Referring to FIG. 9, a display device 1000_1 may include the display panel 100, the scan driver 200, the data driver 300, the timing controller 400, and an image controller 500_1.

Here, except that the display device 1000_1 does not include an optical sensor (for example, the optical sensor OS of FIG. 1) and the image controller 500_1 does not receive an optical waveform (for example, the optical waveform OW of FIG. 1) from an optical sensor (for example, the optical sensor OS of FIG. 1), the display device 1000_1 and the image controller 500_1 of FIG. 9 and FIG. 10 are substantially equal to or similar to the display device 1000 and the image controller 500 described with reference to FIG. 1 and FIG. 5, so duplicate descriptions thereof will not be repeated.

The image controller 500_1 may receive the input image data IDATA and the control signal CS from the outside (for example, a processor).

In an embodiment, the image controller 500_1 may detect the signal waveform of the image currently being displayed based on the input image data IDATA and the control signal CS, and may detect the optical characteristic information of the image displayed by the display panel 100 (or the light emitted by the display panel 100) based on the signal waveform.

For example, referring further to FIG. 10, the image controller 500_1 may include the refresh rate calculator 510, the grayscale calculator 520, a threshold determiner 530_1, the comparator 550, the refresh rate control signal generator 560, an image analyzer 570, and a memory 580.

In the embodiment, the image analyzer 570 may detect a signal waveform OW_1 for the image displayed by the display panel 100 based on the input image data IDATA and the control signal CS.

For example, the image analyzer 570 may extract grayscale values of input images corresponding to a plurality of consecutive frames from the input image data IDATA, and may extract the image refresh rate at which the display device 1000_1 is driven from the control signal CS to detect the signal waveform OW_1 for the luminance values of the image displayed by the display panel 100 based on the extracted grayscale values and the image refresh rate. Accordingly, the signal waveform OW_1 may have a waveform that is substantially the same as the optical waveform OW described with reference to FIG. 5.

For example, the image analyzer 570 may receive signal waveform data SD from the memory 580. Here, the signal waveform data SD may include grayscale values and information on signal waveforms according to an image refresh rate, and the image analyzer 570 may use the signal waveform data SD to extract the signal waveform OW_1 corresponding to the extracted grayscale values and the image refresh rate.

The threshold determiner 530_1 may receive the signal waveform OW_1 from the image analyze 570, and based on the signal waveform OW_1 of the image currently displayed by the display device 1000_1 (or the display panel 100), and based on the refresh rate information FI and the grayscale information GI for the target image to be displayed after the refresh rate is changed, the threshold determiner 530_1 may determine the threshold value TV at which a transient flashing phenomenon is perceived by the user (for example, a flicker is perceived by the user) at a time point when the image refresh rate is changed. The configuration in which the threshold determiner 530_1 determines the threshold value TV by using the signal waveform OW_1 is substantially the same as or similar to the configuration in which the threshold determiner 530_1 described with reference to FIG. 5 determines the threshold value TV by using the optical waveform OW, so duplicate descriptions thereof will not be repeated.

In addition, the image analyzer 570 may generate (or detect) optical characteristic information OCI_1 of the detected signal waveform OW_1.

In the embodiment, the image analyzer 570 may analyze the signal waveform OW_1, and may generate the optical characteristic information OCI_1 including the value of the flashing luminance (for example, the maximum value of the flashing luminance) predicted according to the analyzed result. Here, the configuration in which the image analyzer 570 generates the optical characteristic information OCI_1 is substantially the same as or similar to the configuration in which the optical waveform analyzer 540 described with reference to FIG. 5 generates the optical characteristic information OCI, so duplicate descriptions thereof will not be repeated.

The display device according to the embodiments of the present disclosure may control an image refresh rate, by detecting optical characteristic information by analyzing an optical waveform (or a signal waveform) of a display panel, and by comparing a maximum value of flashing luminance according to the optical characteristic information and a threshold value determined based on input image data and a control signal.

Accordingly, even when the image refresh rate of the display device is changed, a phenomenon in which transient flashing (or a flicker) is perceived by a user may be prevented (for example, eliminated), and thus visibility may be improved.

However, the effects of the present disclosure are not limited to the above-described effects, and may be variously extended without departing from the spirit and scope of the present disclosure.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A display device comprising:

a display panel including pixels;

an optical sensor configured to measure an optical waveform of the display panel;

a timing controller configured to generate image data based on input image data and generate a first control signal and a second control signal based on a control signal;

a scan driver configured to supply a scan signal to the pixels based on the first control signal;

a data driver configured to generate a data signal corresponding to the image data based on the second control signal and the image data to supply it to the pixels; and an image controller configured to detect optical characteristic information of the display panel based on the optical waveform, determine a threshold value based on the optical waveform, an image refresh rate of the display panel, and grayscale values corresponding to the input image data, and generate a refresh rate control signal for controlling the image refresh rate based on the optical characteristic information and the threshold value, wherein the timing controller controls the image refresh rate of the display panel based on the refresh rate control signal.

2. The display device of claim 1, wherein the display panel is driven at a first refresh rate in a first period and is driven at the second refresh rate in a second period after the first period, and wherein the first refresh rate is greater than the second refresh rate.

3. The display device of claim 2, wherein the optical characteristic information includes a value of flashing luminance, and wherein the value of the flashing luminance corresponds to a maximum value of perceived luminance perceived by a user corresponding to a time point at which the image refresh rate is changed from the first period to the second period.

4. The display device of claim 3, wherein the image controller compares the value of the flashing luminance with the threshold value and generates the refresh rate control signal in response to the compared result.

5. The display device of claim 4, wherein, when the value of the flashing luminance is equal to or greater than the threshold value, the image controller controls the image refresh rate of the display panel to be gradually changed from the first refresh rate in the first period to the second refresh rate in the second period.

6. The display device of claim 5, wherein the image controller controls the display panel to be driven at a third refresh rate in a third period disposed between the first period and the second period, and wherein the third refresh rate has a value between the first refresh rate and the second refresh rate.

7. The display device of claim 4, wherein, when the value of the flashing luminance is less than the threshold value, the image controller controls the image refresh rate of the display panel to be immediately changed from the first refresh rate in the first period to the second refresh rate in the second period.

8. The display device of claim 3, wherein the image controller includes:

a refresh rate calculator configured to generate refresh rate information corresponding to an image refresh rate of a target image to be displayed in the second period based on the control signal;

a gray scale calculator configured to generate gray scale information corresponding to grayscale values for the target image based on the input image data; and a threshold determiner configured to determine the threshold value based on the refresh rate information, the grayscale information, and the optical waveform.

9. The display device of claim 8, wherein the threshold determiner determines, as the threshold value, a value obtained by adding a reference value to a value of perceived luminance corresponding to a moment at which the image refresh rate is changed in the first period.

10. The display device of claim 8, wherein the threshold determiner determines the threshold value based on a look-up table.

11. The display device of claim 8, wherein the image controller further includes an optical waveform analyzer for generating the optical characteristic information based on the optical waveform.

12. The display device of claim 11, wherein the optical waveform analyzer includes:

a domain converter configured to detect a frequency characteristic of the optical waveform to generate frequency information;

a luminance calculator configured to detect luminance values of the optical waveform to generate luminance information; and an optical characteristic detector configured to detect a value of the flashing luminance based on the frequency information and the luminance information of the optical waveform to generate the optical characteristic information.

13. The display device of claim 12, wherein the domain converter converts the optical waveform into a frequency domain through a fast Fourier transform.

14. The display device of claim 12, wherein the luminance information includes a value of average luminance of the optical waveform.

15. The display device of claim 11, wherein the image controller further includes:

a comparator configured to compare a value of the flashing luminance included in the optical characteristic information with the threshold value to generate a compared result data; and a refresh rate control signal generator configured to generate the refresh rate control signal based on the compared result data.

16. The display device of claim 15, wherein the refresh rate control signal generator applies a weight function to a difference between the value of the flashing luminance and the threshold value to generate the refresh rate control signal.

* * * * *